United States Patent
Iwamoto et al.

(10) Patent No.: US 11,955,009 B2
(45) Date of Patent: Apr. 9, 2024

(54) AUTONOMOUS DRIVING SYSTEM, AUTONOMOUS DRIVING CONTROL METHOD, AND NON-TRANSITORY STORAGE MEDIUM

(71) Applicant: TOYOTA JIDOSHA KABUSHIKI KAISHA, Toyota Aichi-ken (JP)

(72) Inventors: Takayuki Iwamoto, Sunto-gun Shizuoka-ken (JP); Kunihito Satou, Mishima Shizuoka-ken (JP); Takefumi Goto, Gotemba Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 37 days.

(21) Appl. No.: 17/719,958

(22) Filed: Apr. 13, 2022

(65) Prior Publication Data
US 2022/0366788 A1    Nov. 17, 2022

(30) Foreign Application Priority Data
May 11, 2021    (JP) .................................. 2021-080496

(51) Int. Cl.
*H04W 4/44*    (2018.01)
*B60W 50/02*    (2012.01)
(Continued)

(52) U.S. Cl.
CPC ... *G08G 1/096844* (2013.01); *B60W 50/0205* (2013.01); *B60W 50/029* (2013.01);
(Continued)

(58) Field of Classification Search
CPC ..... H04W 4/44; H04W 4/38; B60W 2556/45; B60W 50/029; B60W 2050/0292;
(Continued)

(56) References Cited

U.S. PATENT DOCUMENTS 9,432,929 B1 *   8/2016   Ross ....................... H04L 67/12
10,324,463 B1 *  6/2019   Konrardy ............. G05D 1/0278
(Continued)

FOREIGN PATENT DOCUMENTS

JP    2018-077649 A    5/2018

OTHER PUBLICATIONS

U.S. Appl. No. 17/734,513, filed May 2, 2022; Inventor: Takayuki Iwamoto.

*Primary Examiner* — Truc M Do
(74) *Attorney, Agent, or Firm* — Dinsmore & Shohl LLP

(57) ABSTRACT

A system includes: one or more storage devices that store specific position information indicating a specific position where an autonomous vehicle has a possibility to require remote support; and one or more processors configured to set a first target route as a target route, determine whether an abnormality has occurred in a remote support system, when the abnormality is detected in the remote support system, search for an alternative route that is a route to the destination based on the specific position information, the alternative route having a smaller number of the specific positions to be passed through by the autonomous vehicle than the first target route, when the alternative route is found, change the target route from the first target route to the alternative route, and control the autonomous vehicle.

16 Claims, 15 Drawing Sheets

(51) Int. Cl.
*B60W 50/029* (2012.01)
*B60W 60/00* (2020.01)
*G08G 1/0967* (2006.01)
*G08G 1/0968* (2006.01)

(52) U.S. Cl.
CPC ... *B60W 60/0015* (2020.02); *G08G 1/096725* (2013.01); *G08G 1/096783* (2013.01); *H04W 4/44* (2018.02); *B60W 2050/0292* (2013.01); *B60W 2556/40* (2020.02); *B60W 2556/45* (2020.02)

(58) Field of Classification Search
CPC ......... B60W 60/0015; B60W 50/0205; B60W 60/00186; B60W 2556/40; B60W 2556/50; B60W 50/035; B60W 60/00; B60W 30/09; B60W 30/0956; B60W 50/02; B60W 60/007; B60W 2050/021; B60W 2050/0215; B60W 2420/403; B60W 2552/00; B60W 2554/40; B60W 2554/80; B60W 2555/20; B60W 2556/20; B60W 2756/10; B60W 30/08; B60W 30/181; B60W 40/04; B60W 60/001; B60W 60/0011; B60W 60/00182; B60W 60/00274; B60W 2050/0002; B60W 2050/0006; B60W 2050/0295; B60W 2420/408; B60W 2552/05; B60W 2554/402; B60W 2554/4046; B60W 2556/35; B60W 2720/106; B60W 50/0097; B60W 50/023; B60W 50/12; B60W 60/00272; B60W 60/005; G05D 1/0022; G05D 1/0038; G05D 1/0055; G05D 1/0088; G05D 1/0027; G05D 1/0077; G05D 1/0225

See application file for complete search history.

(56) References Cited

U.S. PATENT DOCUMENTS

| | | |
|---|---|---|
| 10,386,845 B1 | 8/2019 | Konrardy et al. |
| 2016/0026659 A1 | 1/2016 | Harley et al. |
| 2018/0257643 A1 | 9/2018 | Kroop et al. |
| 2018/0300964 A1* | 10/2018 | Lakshamanan .... G01C 21/3492 |
| 2019/0270408 A1* | 9/2019 | Castro ..................... B60Q 9/00 |

* cited by examiner

AUTONOMOUS DRIVING SYSTEM, AUTONOMOUS DRIVING CONTROL METHOD, AND NON-TRANSITORY STORAGE MEDIUM

CROSS-REFERENCE TO RELATED APPLICATION

This application claims priority to Japanese Patent Application No. 2021-080496 filed on May 11, 2021, incorporated herein by reference in its entirety.

BACKGROUND

1. Technical Field

The present disclosure relates to an autonomous driving system, an autonomous driving control method, and a non-transitory storage medium.

2. Description of Related Art

Japanese Unexamined Patent Application Publication No. 2018-077649 (JP 2018-077649 A) discloses a remote driving control device that remotely drives a vehicle. The remote driving control device remotely drives the vehicle by communicating with the vehicle.

SUMMARY

A remote support technique for remotely supporting driving of an autonomous vehicle will be considered. Remote support requires communication between a remote support device and an autonomous vehicle. A "remote support system" includes configurations and functions for providing the remote support to the autonomous vehicle. For example, the remote support system includes a remote support device, a communication network, and a communication device mounted on the autonomous vehicle. If an abnormality occurs in at least a part of the remote support system, the remote support system cannot provide the remote support to the autonomous vehicle or the accuracy of remote support will decrease.

The present disclosure provides a technique capable of appropriately controlling the autonomous vehicle when the abnormality occurs in the remote support system that provides the remote support to the autonomous vehicle.

An autonomous driving system according to a first aspect of the present disclosure includes: one or more storage devices that store specific position information indicating a specific position where an autonomous vehicle has a possibility to require remote support; and one or more processors configured to set a first target route as a target route that is a route to a destination, determine whether an abnormality has occurred in a remote support system, the remote support system being configured to provide the remote support to the autonomous vehicle that is an object of the remote support, when the abnormality is detected in the remote support system, search for an alternative route that is a route to the destination based on the specific position information, the alternative route having a smaller number of the specific positions to be passed through by the autonomous vehicle than the first target route, when the alternative route is found, change the target route from the first target route to the alternative route, and control the autonomous vehicle.

An autonomous driving control method according to a second aspect of the present disclosure includes: setting a first target route as a target route that is a route to a destination; determining whether an abnormality has occurred in a remote support system, the remote support system being configured to provide remote support to an autonomous vehicle that is an object of the remote support; when the abnormality is detected in the remote support system, searching for an alternative route that is a route to the destination based on specific position information indicating a specific position where the autonomous vehicle has a possibility to require the remote support, the alternative route having a smaller number of specific positions to be passed through by the autonomous vehicle than the first target route; when the alternative route is found, changing the target route from the first target route to the alternative route; and controlling the autonomous vehicle.

A non-transitory storage medium according to a third aspect of the present disclosure stores an autonomous driving control program that is executable by one or more processors and that causes the one or more processors to perform functions. The functions include: setting a first target route as a target route that is a route to a destination; determining whether an abnormality has occurred in a remote support system, the remote support system being configured to provide remote support to an autonomous vehicle that is an object of the remote support; when the abnormality is detected in the remote support system, searching for an alternative route that is a route to the destination based on specific position information indicating a specific position where the autonomous vehicle has a possibility to require the remote support, the alternative route having a smaller number of specific positions to be passed through by the autonomous vehicle than the first target route; when the alternative route is found, changing the target route from the first target route to the alternative route; and controlling the autonomous vehicle.

According to the present disclosure, when the abnormality is detected in the remote support system, the autonomous driving system searches for the alternative route having a smaller number of specific positions to be passed through by an autonomous vehicle than a first target route. When such the alternative route is found, a target route to a destination is changed from the first target route to the alternative route. Since the number of specific positions to be passed through by the autonomous vehicle decreases, the overall probability that remote support will be required decreases. Therefore, the probability that the autonomous vehicle can reach the destination increases. Even when the abnormality is detected in the remote support system, it is not necessary to end autonomous driving near the current position. Performing a rerouting process makes it possible to continue autonomous driving as much as possible.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure will be described with reference to the accompanying drawings.

1. Overview of Remote Support

Figure 1:
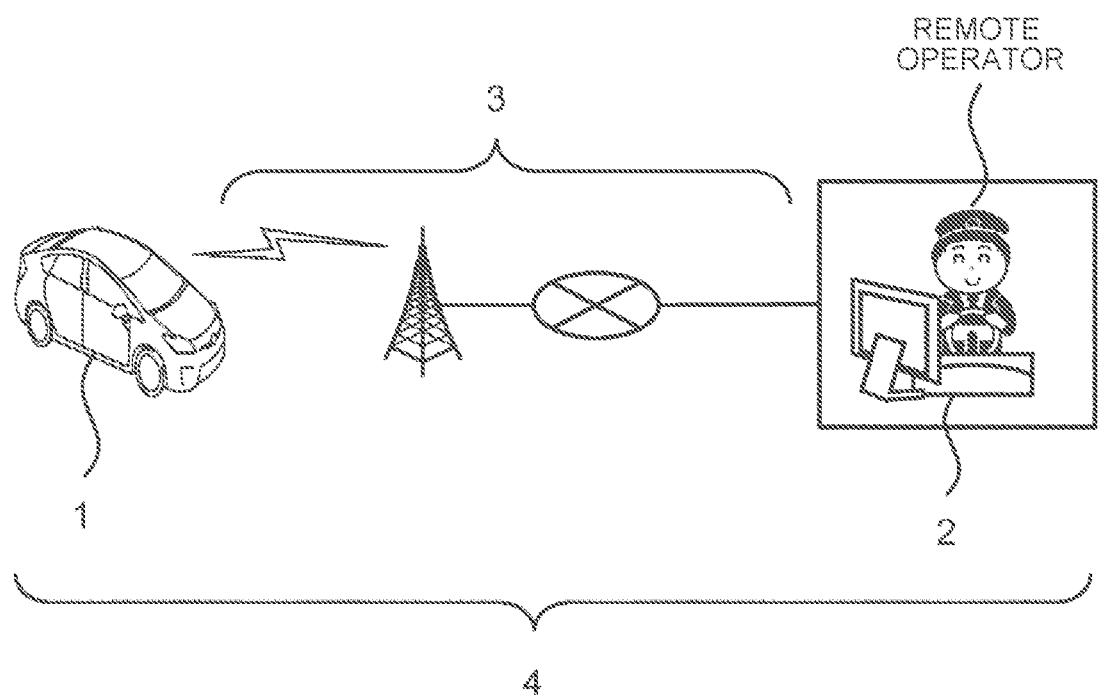
FIG. 1 is a conceptual diagram showing a remote support system according to an embodiment of the present disclosure.

FIG. 1 is a conceptual diagram showing a remote support system according to an embodiment of the present disclosure. The remote support system includes an autonomous vehicle 1, a remote support device 2, and a communication network 3.

The autonomous vehicle 1 is a vehicle capable of autonomous driving. Autonomous driving is assumed that the one does not necessarily require a driver to fully focus on driving (so-called Level 3 or higher autonomous driving). The autonomous vehicle 1 may be a Level 4 or higher autonomous vehicle that does not require a driver. The autonomous vehicle 1 is an object of remote support in the present embodiment.

The remote support device 2 is a device for remotely supporting the autonomous vehicle 1, and the remote support device 2 is operated by a remote operator. The autonomous vehicle 1 and the remote support device 2 are connected to each other via the communication network 3 so that they can communicate with each other via the communication network 3. The remote support device 2 communicates with the autonomous vehicle 1 via the communication network 3 to remotely support driving of the autonomous vehicle 1. More specifically, the remote operator operates the remote support device 2 to remotely support driving of the autonomous vehicle 1. It can also be said that the remote support device 2 is a device that assists the remote support by the remote operator to the autonomous vehicle 1.

The communication network 3 includes a wireless base station, a wireless communication network, a wired communication network, etc. An example of the wireless communication network is a 5th Generation (5G) network.

Figure 2:
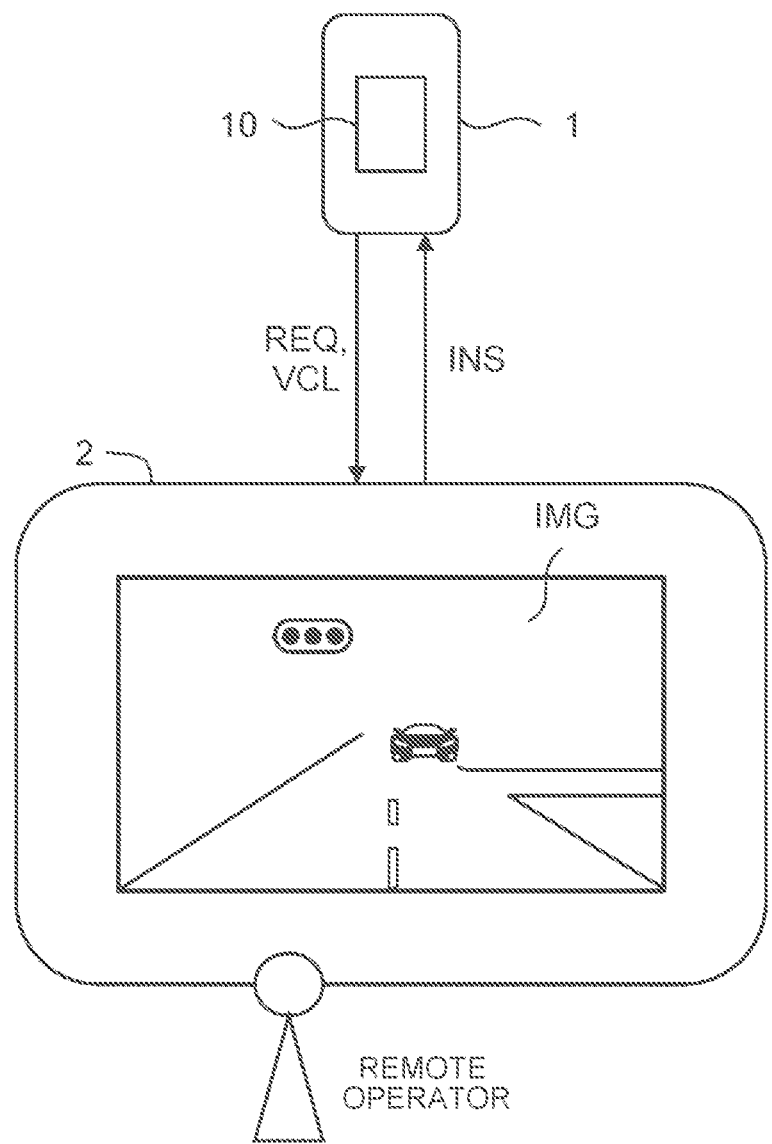
FIG. 2 is a conceptual diagram illustrating an overview of remote support according to the embodiment of the present disclosure.

FIG. 2 is a conceptual diagram illustrating an overview of remote support according to the present embodiment. An autonomous driving system 10 controls the autonomous vehicle 1. The autonomous driving system 10 performs various vehicle processes during autonomous driving. Typical vehicle processes that are performed during autonomous driving include the following processes.

(1) Perception process: The autonomous driving system 10 perceives the surroundings of the autonomous vehicle 1 by using a perception sensor. For example, the autonomous driving system 10 perceives a traffic light indication (e.g., a green light, a yellow light, a red light, or a right turn signal, etc.).

(2) Action determination process: The autonomous driving system 10 determines whether to take an action based on the results of the perception process. Examples of the action include starting to move, stopping, turning right, turning left, and changing lanes, etc.

(3) Timing determination process: The autonomous driving system 10 determines the timing to take the action.

Figure 3:
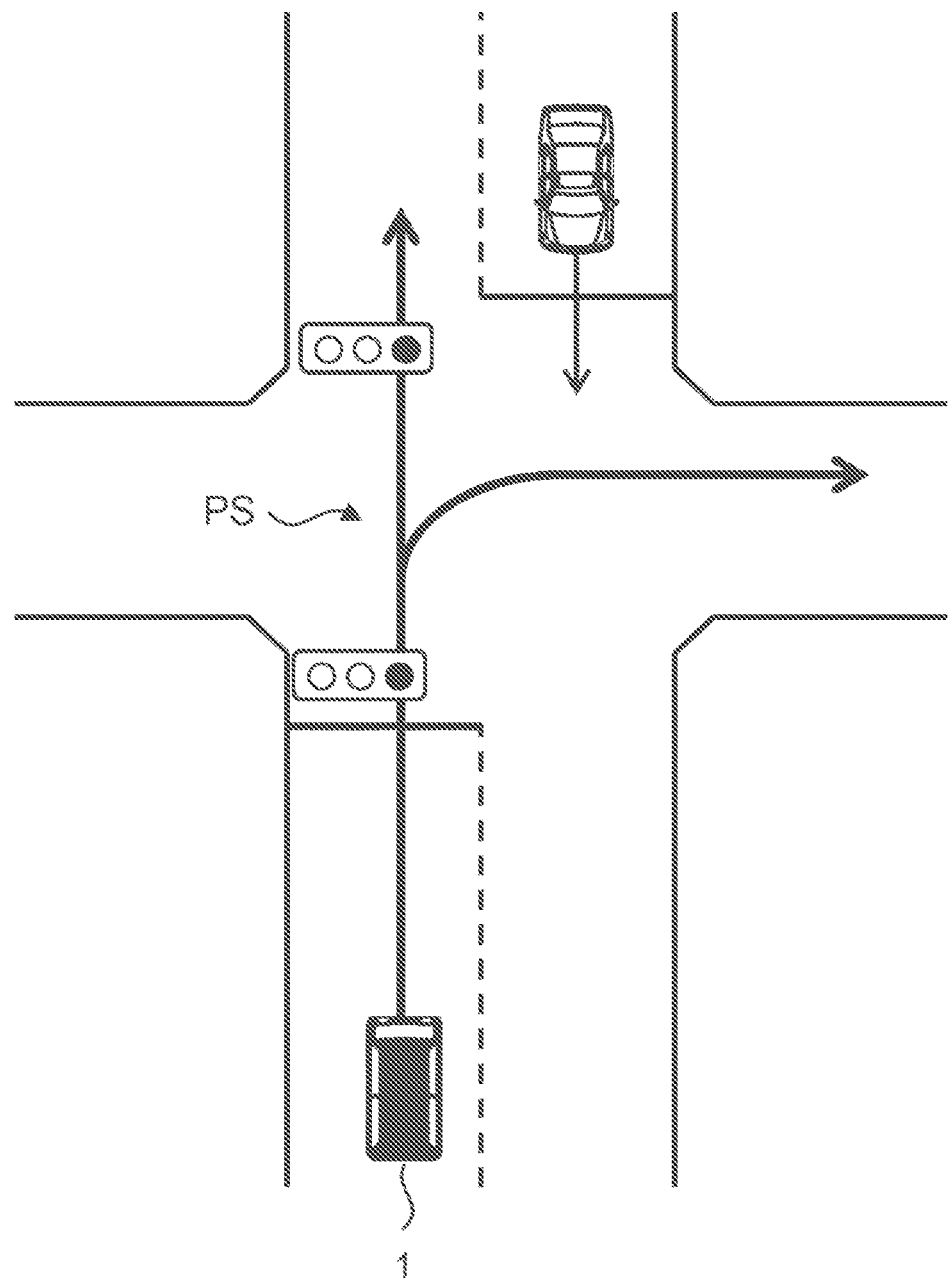
FIG. 3 is a conceptual diagram illustrating an example of a specific position according to the embodiment of the present disclosure.

Typically, situations in which remote support by the remote operator is necessary are situations in which autonomous driving is difficult. For example, there is a possibility that remote support is required at such an intersection as shown in FIG. 3.

For example, the perception accuracy of a traffic light indication may decrease when a traffic light installed at an intersection is in sunlight. When a traffic light indication cannot be accurately identified in the perception process, the autonomous driving system 10 requires remote support for traffic light perception. When a traffic light indication cannot be identified, it is also difficult to determine the type of action to be taken and the timing to take the action. Therefore, the autonomous driving system 10 also requires remote support for the action determination process and the timing determination process.

Even when a traffic light indication is identified, it may be difficult to determine whether the action may actually be taken. For example, an oncoming vehicle may enter an intersection or an oncoming vehicle or a preceding vehicle may still stay in the intersection, even after a traffic light indication seen from the autonomous driving system 10 shows that "vehicles can turn right." In such a case, the autonomous driving system 10 may request remote support for the action determination process and the timing determination process while the autonomous driving system 10 stops the autonomous vehicle 1.

In another example, when there is a construction section ahead of the autonomous vehicle 1, it may be difficult to determine whether to change lanes. In this case, the autonomous driving system 10 may request remote support for the action determination process.

The autonomous driving system 10 may request the remote operator to remotely drive (remotely control) the autonomous vehicle 1. The "remote support" in the present embodiment is a concept including not only support for at least one of the perception process, the action determination process, and the timing determination process, but also remote driving (remote control).

When the autonomous driving system 10 determines that remote support is necessary, it sends a remote support request REQ to the remote support device 2 via the communication network 3. The remote support request REQ is information requesting the remote operator for remote support for the autonomous vehicle 1. The remote support device 2 notifies the remote operator of the received remote support request REQ. In response to the remote support request REQ, the remote operator starts remotely supporting the autonomous vehicle 1.

The autonomous driving system 10 sends vehicle information VCL to the remote support device 2 via the communication network 3 during the remote support. The vehicle information VCL indicates the state of the autonomous vehicle 1, the surroundings of the autonomous vehicle 1, the results of the vehicle processes performed by the autonomous driving system 10, etc. The remote support device 2 presents the vehicle information VCL received from the autonomous driving system 10 to the remote operator. For example, as shown in FIG. 2, the remote support device 2 displays image information IMG captured by a camera mounted on the autonomous vehicle 1 on a display device.

The remote operator remotely supports the autonomous vehicle 1 while referring to the vehicle information VCL. An operator instruction INS is an instruction to the autonomous vehicle 1 that is input by the remote operator. The remote support device 2 receives an input of an operator instruction INS from the remote operator. The remote support device 2 then sends the operator instruction INS to the autonomous vehicle 1 via the communication network 3. The autonomous driving system 10 receives the operator instruction INS from the remote support device 2 and controls the autonomous vehicle 1 according to the received operator instruction INS.

2. Process in Case of Abnormality in Remote Support System 2-1. Abnormality in Remote Support System In the present embodiment, a "remote support system 4" means configurations and functions for providing remote support to the autonomous vehicle 1. For example, the remote support system 4 includes the remote support device 2, the communication network 3, and a communication device mounted on the autonomous vehicle 1, etc (see FIG. 1). Examples of the communication device mounted on the autonomous vehicle 1 include a communication electronic control unit (ECU), a communication module, and a transmitter and receiver circuit, etc.

It is herein assumed that an "abnormality" has occurred in at least a part of the remote support system 4 that provides remote support to the autonomous vehicle 1.

For example, the abnormality in the remote support system 4 includes a "functional failure" that is a loss of function of the remote support system 4. An example of the functional failure of the remote support system 4 is a communication disruption. For example, a communication disruption may occur when trouble occurs in the communication network 3. Another example of the functional failure of the remote support system 4 is a failure (down) of the remote support device 2. Still another example of the functional failure of the remote support system 4 is a failure of the communication device mounted on the autonomous vehicle 1. When a functional failure of the remote support system 4 occurs, the remote support system 4 cannot provide remote support to the autonomous vehicle 1.

The abnormality in the remote support system 4 may include "performance degradation" that is degradation in function of the remote support system 4. An example of the performance degradation of the remote support system 4 is a significant decrease in communication speed or throughput. Another example of the performance degradation of the remote support system 4 is a significant increase in communication delay. Still another example of the performance degradation of the remote support system 4 is a decrease in internal communication speed or calculation speed of the communication ECU mounted on the autonomous vehicle 1. The accuracy of remote support may decrease when the performance degradation of the remote support system 4 occurs.

2-2. Rerouting Process

When the abnormality occurs in the remote support system 4, the remote support system 4 cannot provide remote support to the autonomous vehicle 1 or the accuracy of remote support to the autonomous vehicle 1 will decrease. However, it is not always necessary to bring the autonomous vehicle 1 to an emergency stop immediately after detection of the abnormality in the remote support system 4. This is because the autonomous driving system 10 can continue autonomous driving as usual in situations in which remote support is not necessary. That is, it is not necessary to rush to end autonomous driving just because the abnormality is detected in the remote support system 4. According to the present embodiment, the autonomous driving system 10 continues autonomous driving as much as possible in consideration of the possibility that remote support is required.

A position where there is a possibility that remote support for the autonomous vehicle 1 is required is hereinafter referred to as a "specific position PS." For example, the specific position PS is such an intersection as shown in FIG. 3. In another example, the specific position PS may be a position other than an operational design domain (ODD). The ODD is a domain in which an autonomous driving system is designed to properly operate. In still another example, the specific position PS may include a construction section, a traffic jam section, an accident location, etc. Typically, the specific position PS is registered in advance in map information. Alternatively, information on the specific position PS such as a traffic jam section or an accident location may be acquired in real time.

Figure 4:
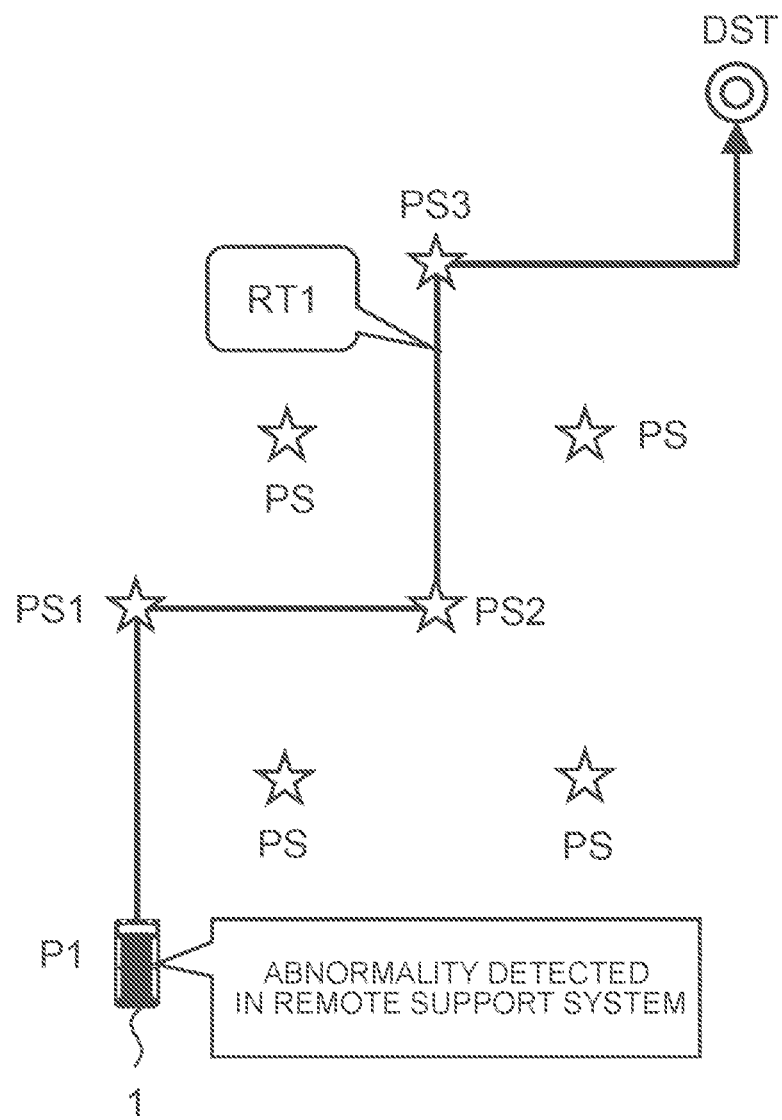
FIG. 4 is a conceptual diagram illustrating a process that is performed when an abnormality occurs in the remote support system according to the embodiment of the present disclosure.

FIG. 4 shows an example of the situation of autonomous driving upon detection of the abnormality in the remote support system 4. In the figure, "P1" and "DST" represent the current position and destination of the autonomous vehicle 1, respectively. A target route RT from the current position P1 to the destination DST of the autonomous vehicle 1 is set by the autonomous driving system 10. For convenience, the current target route RT is referred to as a "first target route RT." The autonomous driving system 10 controls the autonomous vehicle 1 to move toward the destination DST along the first target route RT1.

The specific position PS has already existed on the first target route RT1 to the destination DST at the time the abnormality is detected in the remote support system 4. In the example shown in FIG. 4, there is a plurality of specific positions PS1, PS2, and PS3 on the first target route RT1. In this case, the autonomous driving system 10 searches for an "alternative route RT2" different from the first target route RT1 as the target route RT to the destination DST. In particular, the autonomous driving system 10 searches for the alternative route RT2 having a smaller number of specific positions PSs to be passed through by the autonomous vehicle 1 than the first target route RT1. When such the alternative route RT2 is found, the autonomous driving system 10 performs a "rerouting process" in which the autonomous driving system 10 changes the target route RT to the destination DST from the first target route RT1 to the alternative route RT2.

Figure 5:
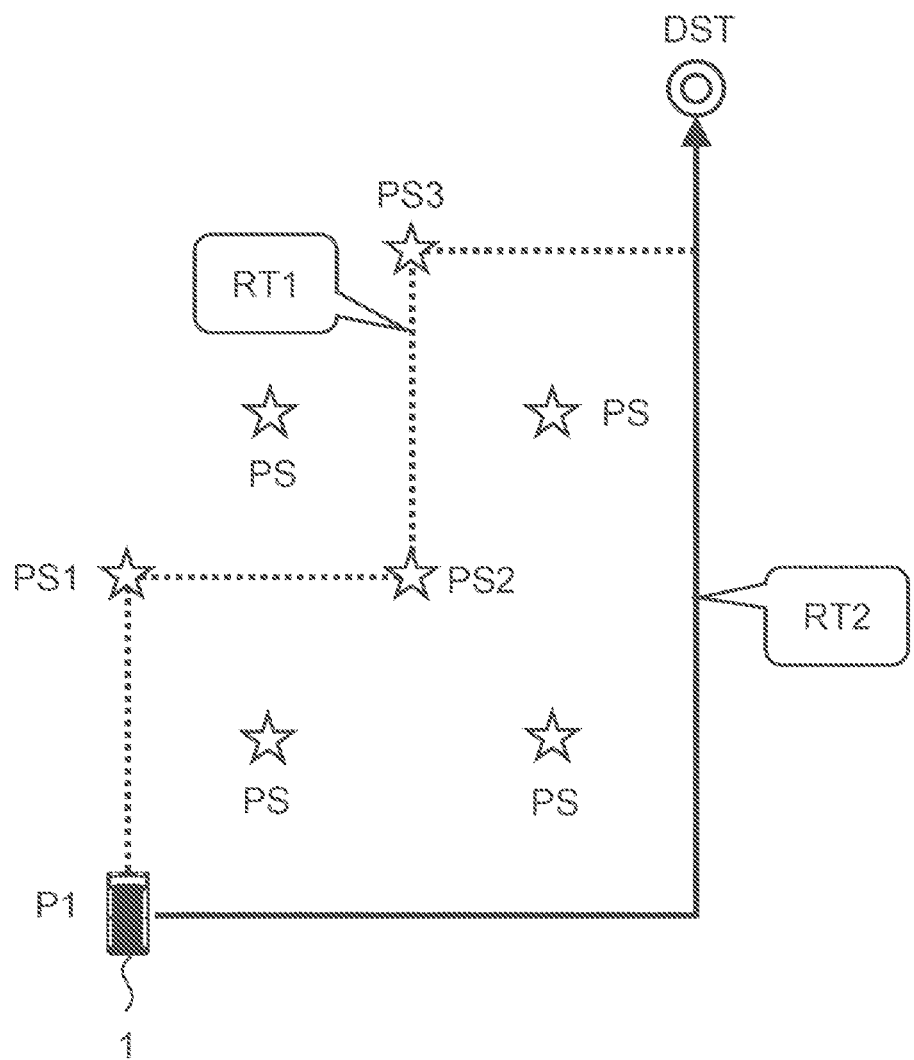
FIG. 5 is a conceptual diagram illustrating an example of the process that is performed when an abnormality occurs in the remote support system according to the embodiment of the present disclosure.

FIG. 5 is a conceptual diagram showing an example of the alternative route RT2. In the example shown in FIG. 5, by following the alternative route RT2, the autonomous vehicle 1 reaches the destination DST from the current position P1 without passing through any specific position PS. Since the alternative route RT2 does not pass through any specific position PS, the autonomous driving system 10 can continue autonomous driving as usual until the autonomous vehicle 1 reaches the destination DST, without requiring remote support. That is, the autonomous vehicle 1 can reach the destination DST without being affected by the abnormality in the remote support system 4.

Figure 6:
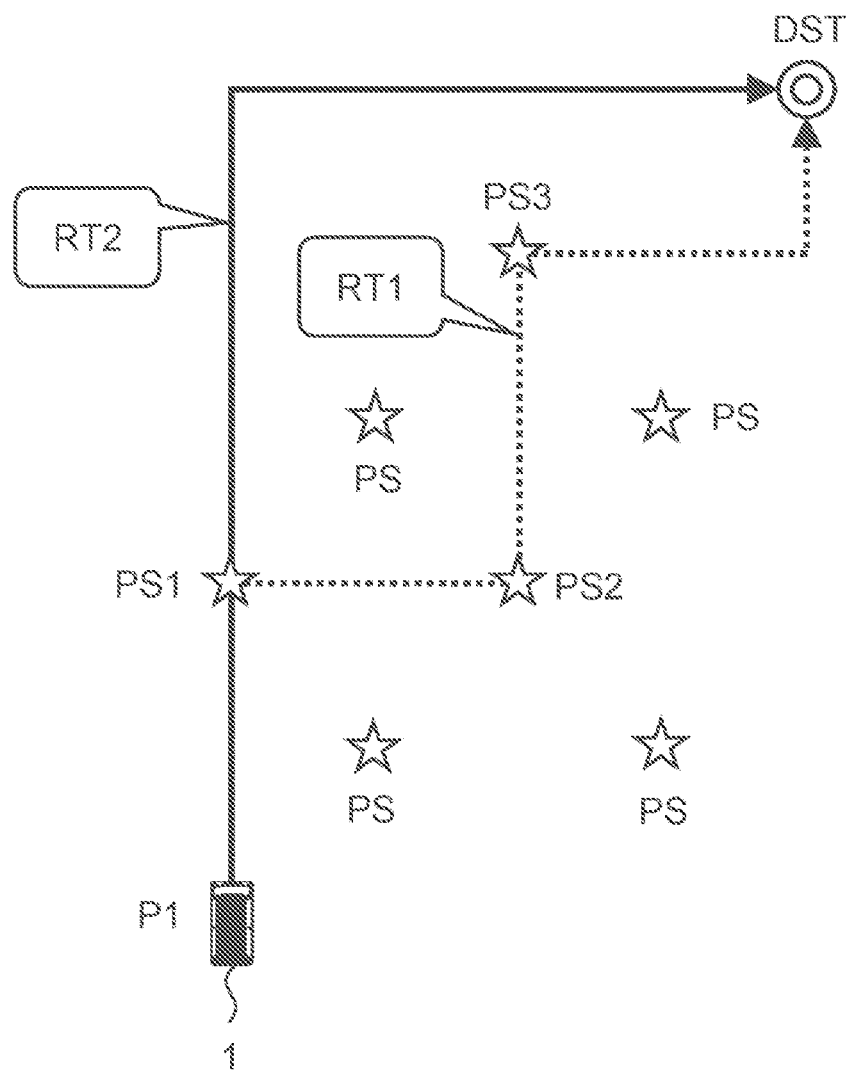
FIG. 6 is a conceptual diagram illustrating another example of the process that is performed when an abnormality occurs in the remote support system according to the embodiment of the present disclosure.

FIG. 6 is a conceptual diagram showing another example of the alternative route RT2. In the example shown in FIG. 6, by following the alternative route RT2, the autonomous vehicle 1 reaches the destination DST from the current position P1 through only one specific position PS1. That is, the alternative route RT2 has a smaller number of specific positions PSs to be passed through by the autonomous vehicle 1 than the first target route RT1. Since the number of specific positions PSs to be passed through by the autonomous vehicle 1 decreases, the overall probability that remote support will be required decreases. Therefore, the probability that the autonomous vehicle 1 can reach the destination DST increases.

In the example shown in FIG. 6, the specific position PS1 is a position where there is a possibility that remote support is required, and remote support is not necessarily required at the specific position PS1. If remote support is not required at the specific position PS1, the autonomous vehicle 1 can pass through the specific position PS1 by normal autonomous driving. Even if remote support is required at the specific position PS1, remote support can be provided when the abnormality in the remote support system 4 is "performance degradation," although the response of the remote support system 4 is slow.

2-3. Evacuation Process

When no alternative route RT2 is found, the autonomous driving system 10 may perform an "evacuation process" in which the autonomous driving system 10 safely evacuates the autonomous vehicle 1.

Figure 7:
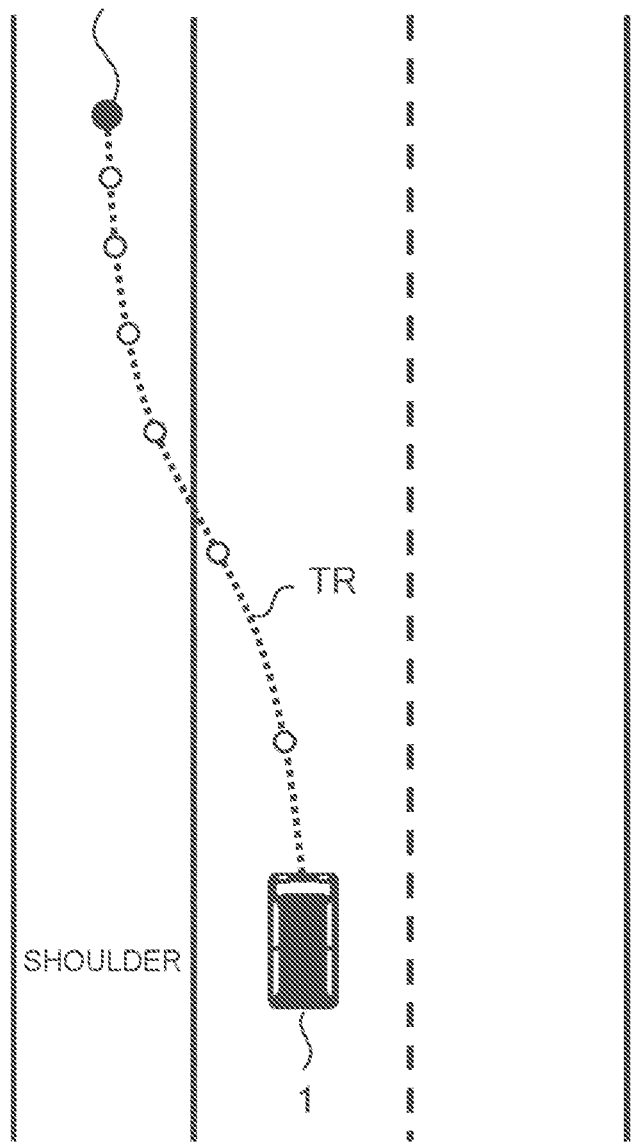
FIG. 7 is a conceptual diagram illustrating an example of an evacuation process according to the embodiment of the present disclosure.

FIG. 7 is a conceptual diagram illustrating an example of the evacuation process. A "target evacuation position PE" is a target stop position at which the autonomous vehicle 1 is to be stopped in the evacuation process. The target evacuation position PE may be set to a safe position on the road. In the example shown in FIG. 7, the target evacuation position PE is set to the shoulder of the road.

The autonomous driving system 10 sets the target evacuation position PE on and around the road on the first target route RT1. The autonomous driving system 10 then controls the autonomous vehicle 1 to move toward the target evacuation position PE and stop at the target evacuation position PE. For example, the autonomous driving system 10 generates a target trajectory TR that the autonomous vehicle 1 moves from the current position toward the target evacuation position PE and stops at the target evacuation position PE. Thereafter, the autonomous driving system 10 controls driving of the autonomous vehicle 1 so that the autonomous vehicle 1 follows the target trajectory TR.

An area that can be used as the target evacuation position PE in the evacuation process may be determined in advance. The area that can be used as the target evacuation position PE in the evacuation process is hereinafter referred to as a "candidate stopping area AC."

Figure 8:
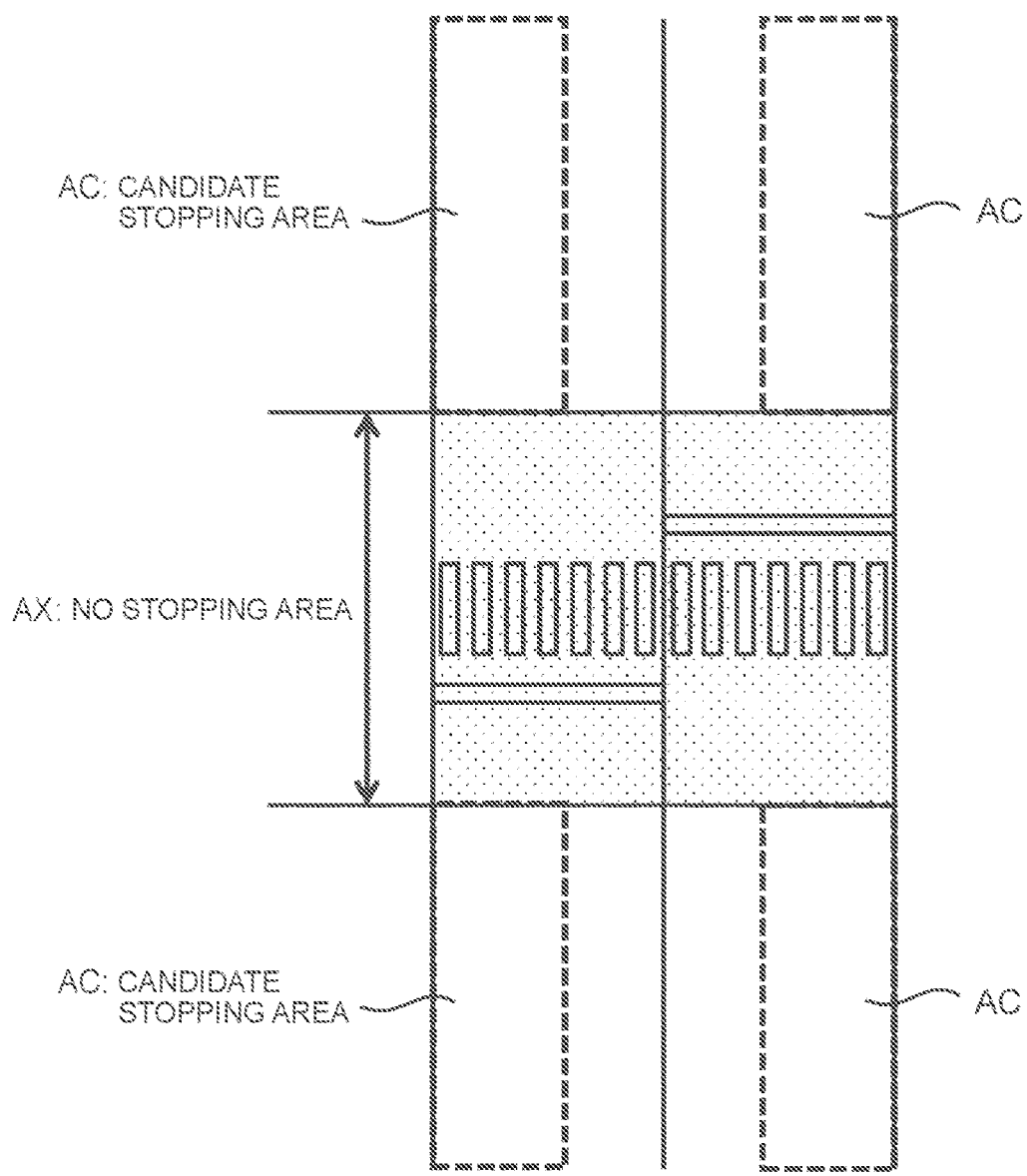
FIG. 8 is a conceptual diagram illustrating an example of a candidate stopping area according to the embodiment of the present disclosure.

FIG. 8 is a conceptual diagram illustrating an example of the candidate stopping area AC. In order to describe the candidate stopping area AC, a "no stopping area AX" will be described first. No stopping areas AXs are areas where parking and stopping of vehicles are prohibited, and are determined in advance by road traffic laws etc. In the example shown in FIG. 8, the no stopping area AX includes a crosswalk and an area with a predetermined width around the crosswalk. The no stopping area AX may include an intersection an area with a predetermined width around the intersection. Other areas such as an area in front of fire fighting equipment are also included in the no stopping areas AX.

The candidate stopping area AC is selected from areas other than the no stopping area AX on the road. Typically, the candidate stopping area AC is a part of the areas other than the no stopping area AX. For example, the candidate stopping area AC is selected in terms of ensuring the safety of the stopped autonomous vehicle 1. As illustrated in FIG. 8, the candidate stopping area AC may be an area relatively close to the edge of the road. The candidate stopping area AC may be set to include a shoulder or a road margin.

Figure 9:
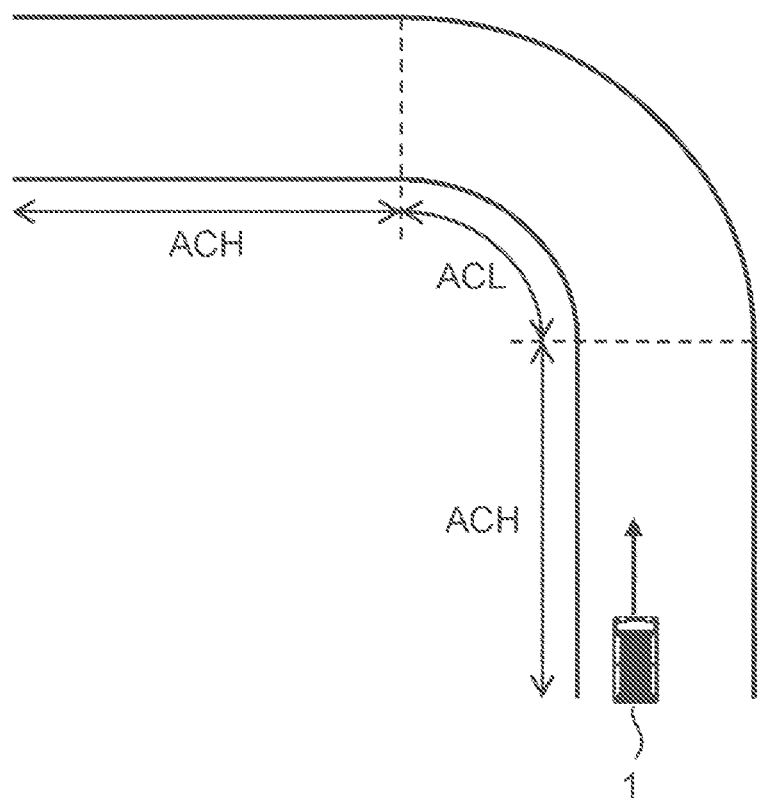
FIG. 9 is a conceptual diagram illustrating an example of a high priority level area and a low priority level area according to the embodiment of the present disclosure.

As shown in FIG. 9, a priority level may be set for the candidate stopping area AC. A high priority level area ACH is a candidate stopping area AC having a relatively high priority level, and a low priority level area ACL is a candidate stopping area AC having a relatively low priority level. In the example shown in FIG. 9, a straight section is set as a high priority level area ACH and a curved section is set as a low priority level area ACL.

The candidate stopping area AC and the no stopping area AX are registered in advance in, for example, the map information. In the evacuation process, the autonomous driving system 10 may set the target evacuation position PE so that the target evacuation position PE is included in the candidate stopping area AC. When the priority level is set for the candidate stopping areas AC, the autonomous driving system 10 sets the target evacuation position PE so that the target evacuation position PE is included in the candidate stopping area AC having as high a priority level as possible.

2-4. Effects

According to the present disclosure, when the abnormality is detected in the remote support system 4, the autonomous driving system 10 searches for the alternative route RT2 having a smaller number of specific positions PSs to be passed through by the autonomous vehicle 1 than the first target route RT1. When such the alternative route RT2 is found, the target route RT to the destination DST is changed from the first target route RT1 to the alternative route RT2. Since the number of specific positions PSs to be passed through by the autonomous vehicle 1 decreases, the overall probability that remote support will be required decreases.

Therefore, the probability that the autonomous vehicle 1 can reach the destination DST increases. Even when the abnormality is detected in the remote support system 4, it is not necessary to end autonomous driving near the current position P1. Performing the rerouting process makes it possible to continue autonomous driving as much as possible.

The autonomous driving system 10 may search for the alternative route RT2 along which the autonomous vehicle 1 reaches the destination DST without passing through any specific position PS may be searched for. In this case, since there is no opportunity that remote support is required, the autonomous driving system 10 can continue autonomous driving as usual until the autonomous vehicle 1 reaches the destination DST. That is, the autonomous vehicle 1 can reach the destination DST without being affected by the abnormality in the remote support system 4.

Hereinafter, the autonomous driving system 10 according to the present embodiment will be described in further detail.

3. Example of Autonomous Driving System

3-1. Configuration Example

The autonomous driving system 10 controls the autonomous vehicle 1. Typically, the autonomous driving system 10 is mounted on the autonomous vehicle 1. Alternatively, at least a part of the autonomous driving system 10 may be located in an external device outside the autonomous vehicle 1 and may remotely control the autonomous vehicle 1. That is, the autonomous driving system 10 may be dispersedly located in the autonomous vehicle 1 and the external device.

Figure 10:
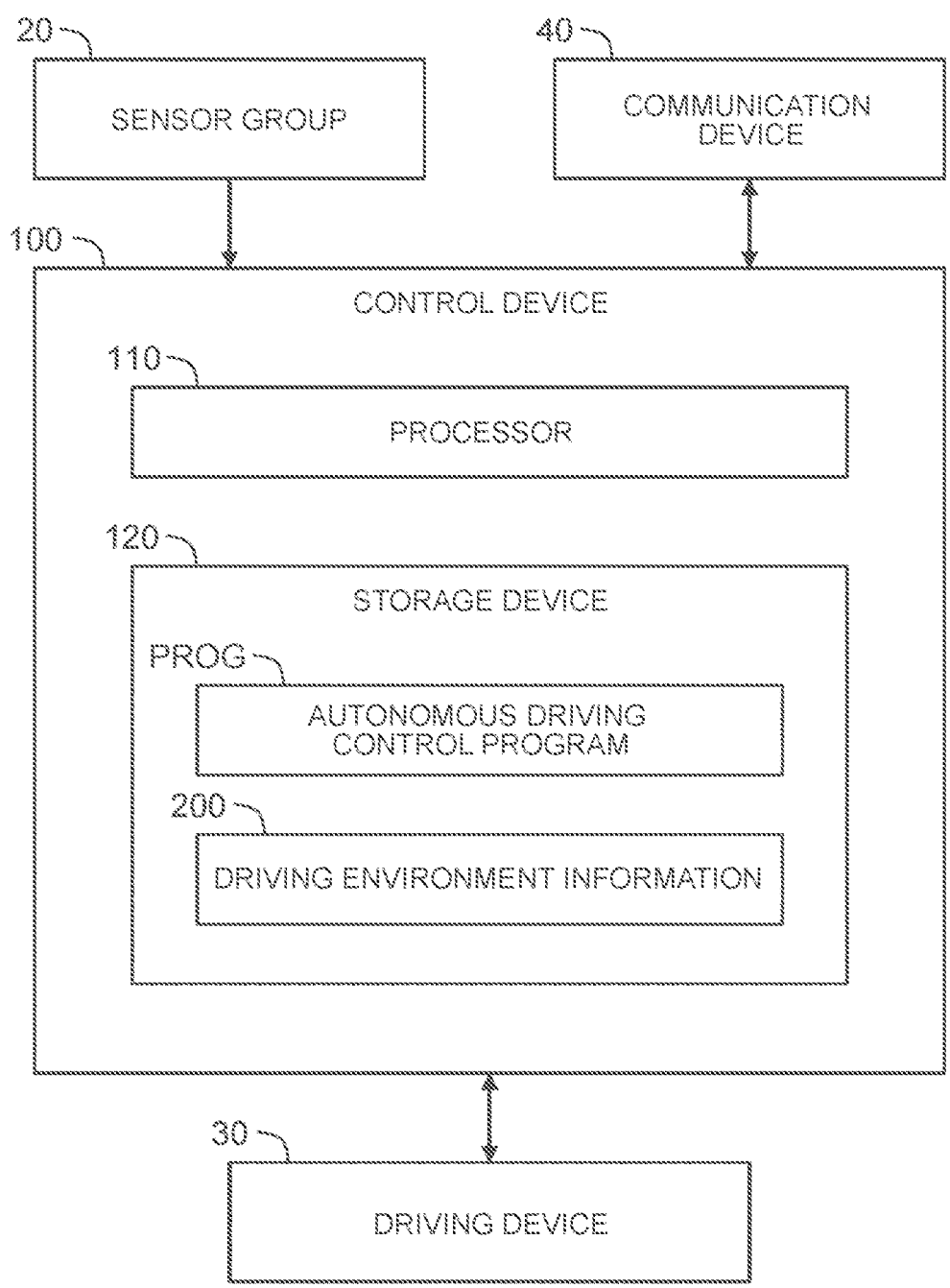
FIG. 10 is a block diagram showing a configuration example of an autonomous driving system according to the embodiment of the present disclosure.

FIG. 10 is a block diagram showing a configuration example of the autonomous driving system 10 according to the present embodiment. The autonomous driving system 10 includes a sensor group 20, a driving device 30, a communication device 40, and a control device 100.

The sensor group 20 is mounted on the autonomous vehicle 1. The sensor group 20 includes a vehicle state sensor, a perception sensor, a position sensor, etc. The vehicle state sensor detects the state of the autonomous vehicle 1. Examples of the vehicle state sensor include a vehicle speed sensor, a yaw rate sensor, a lateral acceleration sensor, and a steering angle sensor, etc. The perception sensor detects the surroundings of the autonomous vehicle 1. Examples of the perception sensor include a camera, a Laser Imaging Detection and Ranging (LIDAR), and a radar, etc. The position sensor detects the position and orientation of the autonomous vehicle 1. An example of the position sensor is a Global Positioning System (GPS) sensor.

The driving device 30 is mounted on the autonomous vehicle 1. The driving device 30 includes a steering device, a drive device, and a braking device. The steering device steers wheels. For example, the steering device includes an electric power steering (EPS) system. The drive device is a power source that generates a driving force. Examples of the drive device include an engine, an electric motor, and an in-wheel motor, etc. The braking device generates a braking force.

The communication device 40 communicates with the outside of the autonomous vehicle 1. For example, the communication device 40 communicates with the remote support device 2 via the communication network 3 (see FIGS. 1 and 2). The communication device 40 may communicate with a management server. The communication device 40 may communicate with its surrounding infrastructure via vehicle-to-infrastructure (V2I) communication. The communication device 40 may communicate with other vehicles around it via vehicle-to-vehicle (V2V) communication. The communication device 40 includes a communication electronic control unit (ECU), a communication module, a transmitter and receiver circuit, etc.

The control device 100 controls the autonomous vehicle 1. The control device 100 includes one or more processors 110 (hereinafter simply referred to as the "processor 110") and one or more storage devices 120 (hereinafter simply referred to as the "storage device 120"). The processor 110 performs various processes. For example, the processor 110 includes a central processing unit (CPU). The storage device 120 stores various kinds of information. Examples of the storage device 120 include a volatile memory, a nonvolatile memory, a hard disk drive (HDD), and a solid state drive (SSD). The control device 100 may include one or more ECUs. A part of the control device 100 may be an information processing device outside the autonomous vehicle 1.

An autonomous driving control program PROG is a computer program for controlling the autonomous vehicle 1. The various programs performed by the control device 100 are implemented by the processor 110 executing the autonomous driving control program PROG. The autonomous driving control program PROG is stored in the storage device 120. Alternatively, the autonomous driving control program PROG may be recorded on a computer-readable recording medium.

3-2. Driving Environment Information

Driving environment information 200 indicates the driving environment for the autonomous vehicle 1. The driving environment information 200 is stored in the storage device 120.

Figure 11:
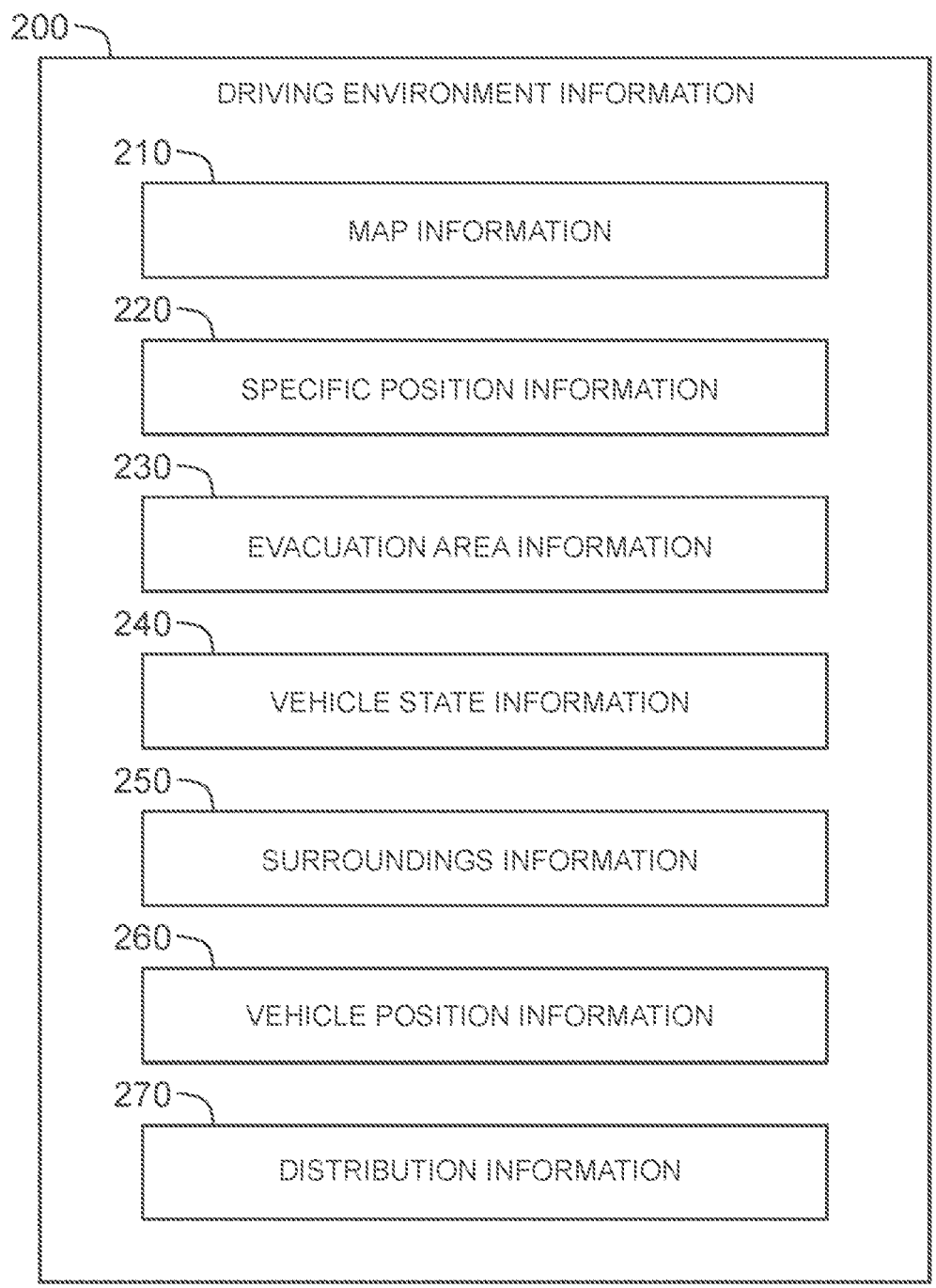
FIG. 11 is a block diagram showing an example of driving environment information according to the embodiment of the present disclosure.

FIG. 11 is a block diagram showing an example of the driving environment information 200. The driving environment information 200 includes map information 210, specific position information 220, evacuation area information 230, vehicle state information 240, surroundings information 250, vehicle position information 260, and distribution information 270.

The map information 210 includes a common navigation map. The map information 210 may indicate lane arrangements, road shapes, etc. The map information 210 may include position information of traffic lights, signs, etc. The processor 110 acquires map information of a necessary area from a map database. The map database may be stored in a predetermined storage device mounted on the autonomous vehicle 1, or may be stored in an external management server. In the latter case, the processor 110 communicates with the management server to acquire necessary map information.

The specific position information 220 indicates the specific position PS where there is a possibility that remote support for the autonomous vehicle 1 is required. For example, the specific position information 220 is created in advance. The specific position information 220 may be included in the map information 210. As will be described later, the specific position information 220 may be added in real time.

The evacuation area information 230 indicates the positions of the candidate stopping area AC and the no stopping area AX (see FIG. 8). The evacuation area information 230 may indicate the priority level of each candidate stopping area AC (see FIG. 9). The evacuation area information 230 is created in advance. The evacuation area information 230 may be included in the map information 210.

The vehicle state information 240 is information indicating the state of the autonomous vehicle 1. The processor 110 acquires the vehicle state information 240 from the vehicle state sensor.

The surroundings information 250 is information indicating the surroundings of the autonomous vehicle 1. The processor 110 acquires the surroundings information 250 by using the perception sensor. For example, the surroundings information 250 includes image information IMG captured by a camera. The surroundings information 250 further includes object information regarding an object around the autonomous vehicle 1. Examples of the object include pedestrians, bicycles, other vehicles (preceding vehicles, parked vehicles, etc.), road configurations (white lines, curbs, guardrails, walls, medians, roadside structures, etc.), signs, and obstacles, etc. The object information indicates the relative position and relative speed of the object with respect to the autonomous vehicle 1.

The vehicle position information 260 is information indicating the position of the autonomous vehicle 1. The processor 110 acquires the vehicle position information 260 from the detection results of the position sensor. The processor 110 may acquire accurate vehicle position information 260 by a well-known self-localization process (Localization) using the object information and the map information 210.

The distribution information 270 includes road traffic information, construction section information, traffic regulation information, etc. The processor 110 receives the distribution information 270 from an information providing server or roadside infrastructure via the communication device 40.

The processor 110 can be aware of a construction section, a traffic jam section, an accident location, etc. based on the distribution information 270. In this case, the processor 110 may add the construction section, the traffic jam section, the accident location, etc. to the specific position information 220.

3-3. Vehicle Driving Control, Autonomous Driving Control

The processor 110 performs "vehicle driving control" in which the processor 110 controls driving of the autonomous vehicle 1. The vehicle driving control includes steering control, acceleration control, and deceleration control. The processor 110 performs the vehicle driving control by controlling the driving device 30 (steering device, drive device, and braking device). Specifically, the processor 110 performs the steering control by controlling the steering device. The processor 110 performs the acceleration control by controlling the drive device. The processor 110 performs the deceleration control by controlling the drive device.

The processor 110 performs autonomous driving control based on the driving environment information 200. More specifically, the processor 110 sets the target route RT to the destination DST based on the map information 210 etc. The processor 110 then performs the vehicle driving control based on the driving environment information 200 so that the autonomous vehicle 1 moves toward the destination DST along the target route RT.

More specifically, the processor 110 generates a driving plan for the autonomous vehicle 1 based on the driving environment information 200. The driving plan includes keeping the current lane, changing lanes, avoiding an obstacle, etc. The processor 110 also generates the target trajectory TR that is necessary for the autonomous vehicle 1 to run according to the driving plan. The target trajectory TR includes a target position and a target speed. The processor 110 then performs the vehicle driving control so that the autonomous vehicle 1 follows the target route RT and the target trajectory TR.

3-4. Process Related to Remote Support

During autonomous driving, the processor 110 determines whether remote support by the remote operator is necessary. Typically, situations in which remote support by the remote operator is necessary are situations in which autonomous driving is difficult. For example, when it is difficult to perform at least one of the perception process, the action determination process, and the timing determination process, the processor 110 determines that remote support by the remote operator is necessary.

When the processor 110 determines that remote support is necessary, it sends a remote support request REQ to the remote support device 2 via the communication device 40. The remote support request REQ requests the remote operator for remote support for the autonomous vehicle 1.

The processor 110 also sends the vehicle information VCL to the remote support device 2 via the communication device 40. The vehicle information VCL includes at least a part of the driving environment information 200. For example, the vehicle information VCL includes image information IMG captured by a camera. The vehicle information VCL may include object information. The vehicle information VCL may include the vehicle state information 240 and the vehicle position information 260. The vehicle information VCL may include the results of the perception process, the action determination process, and the timing determination process.

The processor 110 also receives an operator instruction INS from the remote support device 2 via the communication device 40. An operator instruction INS is an instruction to the autonomous vehicle 1 that is input by the remote operator. When the processor 110 receives an operator instruction INS, it performs the vehicle driving control according to the received operator instruction INS.

4. Process Flow in Case of Abnormality in Remote Support System

Figure 12:
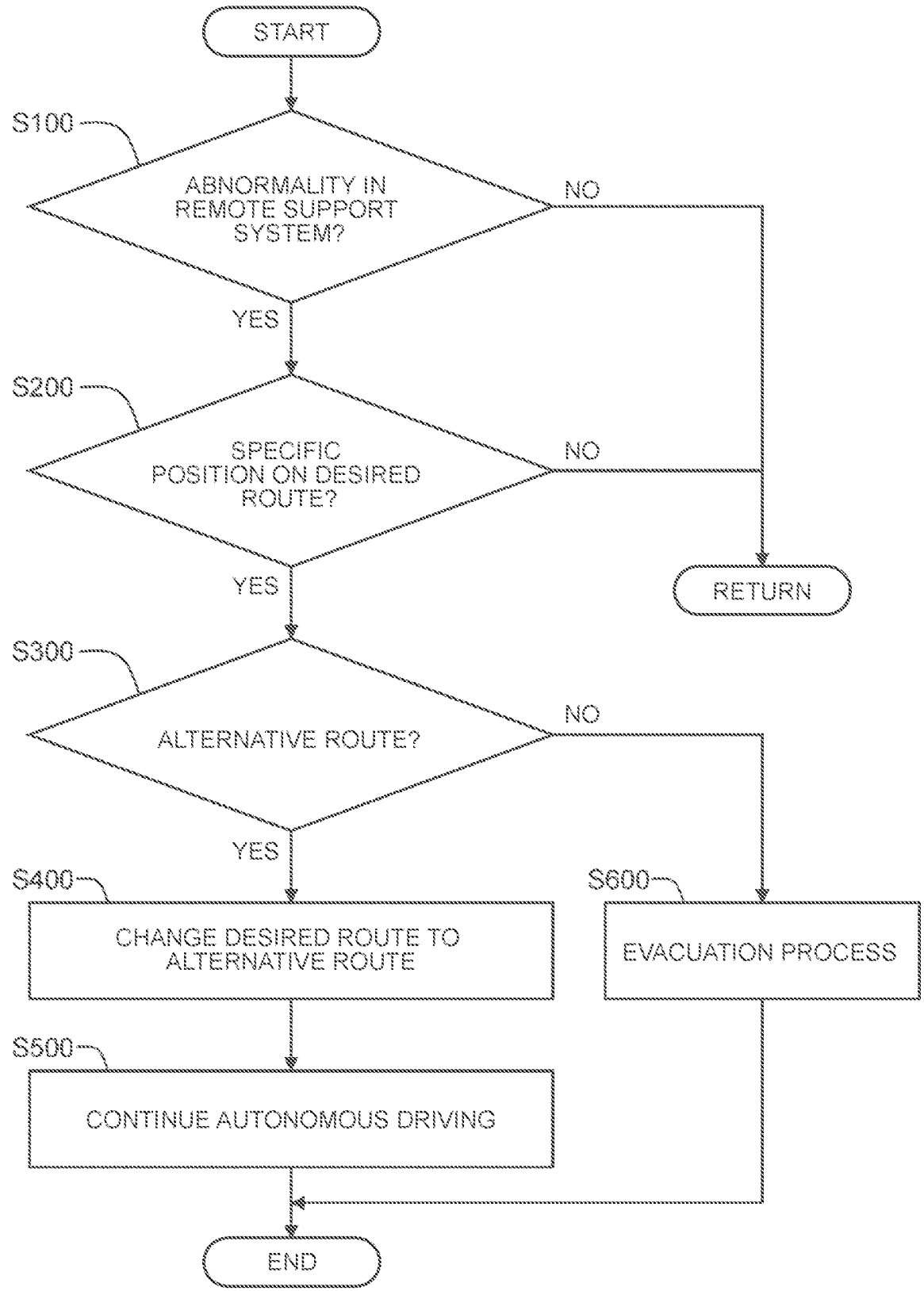
FIG. 12 is a flowchart showing an example of a process that is performed by the autonomous driving system according to the embodiment of the present disclosure.

FIG. 12 is a flowchart showing an example of a process that is performed by the autonomous driving system 10 according to the present embodiment. In particular, FIG. 12 shows a process flow that is performed when the abnormality occurs in the remote support system 4.

4-1. Step S100

In step S100, the processor 110 determines whether there is the abnormality in the remote support system 4 that provides remote support to the autonomous vehicle 1. For example, the remote support system 4 includes the remote support device 2, the communication network 3, and the communication device 40 of the autonomous driving system 10.

The abnormality in the remote support system 4 includes a "functional failure" that is a loss of function of the remote support system 4. For example, the processor 110 monitors the communication status with the remote support device 2 (e.g., throughput, communication speed). When communication with the remote support device 2 is disrupted, the processor 110 determines that a function failure has occurred in the remote support device 2 or the communication network 3. In another example, the communication device 40 (e.g., communication ECU) of the autonomous driving system 10 has a self-diagnostic function. The self-diagnostic function allows the processor 110 to detect a functional failure of the communication device 40.

The abnormality in the remote support system 4 may include performance degradation that is degradation in function of the remote support system 4. For example, the processor 110 monitors the communication status with the remote support device 2 (e.g., throughput, communication speed, communication delay). When the throughput or the communication speed falls below a threshold, the processor 110 determines that performance degradation of the remote support system 4 has occurred. In another example, when the communication delay exceeds a threshold, the processor 110 determines that performance degradation of the remote support system 4 has occurred.

When no abnormality is detected in the remote support system 4 (step S100; NO), the process in this cycle ends. When the abnormality is detected in the remote support system 4 (step S100; YES), the routine proceeds to step S200.

4-2. Step S200

In step S200, the processor 110 determines whether there is the specific position PS on the first target route RT1 from the current position P1 to the destination DST. The first target route RT1 is set by the processor 110, and the processor 110 is aware of the first target route RT1. The specific position PS is obtained from the specific position information 220. Therefore, the processor 110 can determine whether there is the specific position PS on the first target route RT1, based on the specific position information 220.

When there is the specific position PS on the first target route RT1 (step S200; YES), the routine proceeds to step S300. When there is no specific position PS on the first target route RT1 (step S200; NO), the process in this cycle ends.

4-3. Step S300

In step S300, the processor 110 searches for the alternative route RT2 different from the first target route RT1 as the target route RT to the destination DST. In particular, the processor 110 searches for the alternative route RT2 having a smaller number of specific positions PSs to be passed through by the autonomous vehicle 1 than the first target route RT1. The processor 110 can search for such the alternative route RT2 based on the map information 210 and the specific position information 220.

When the alternative route RT2 is found (step S300; YES), the routine proceeds to step S400. When no alternative route RT2 is found (step S300; NO), the routine proceeds to step S600. Hereinafter, some examples of step S300 will be described.

4-3-1. First Example

Figure 13:
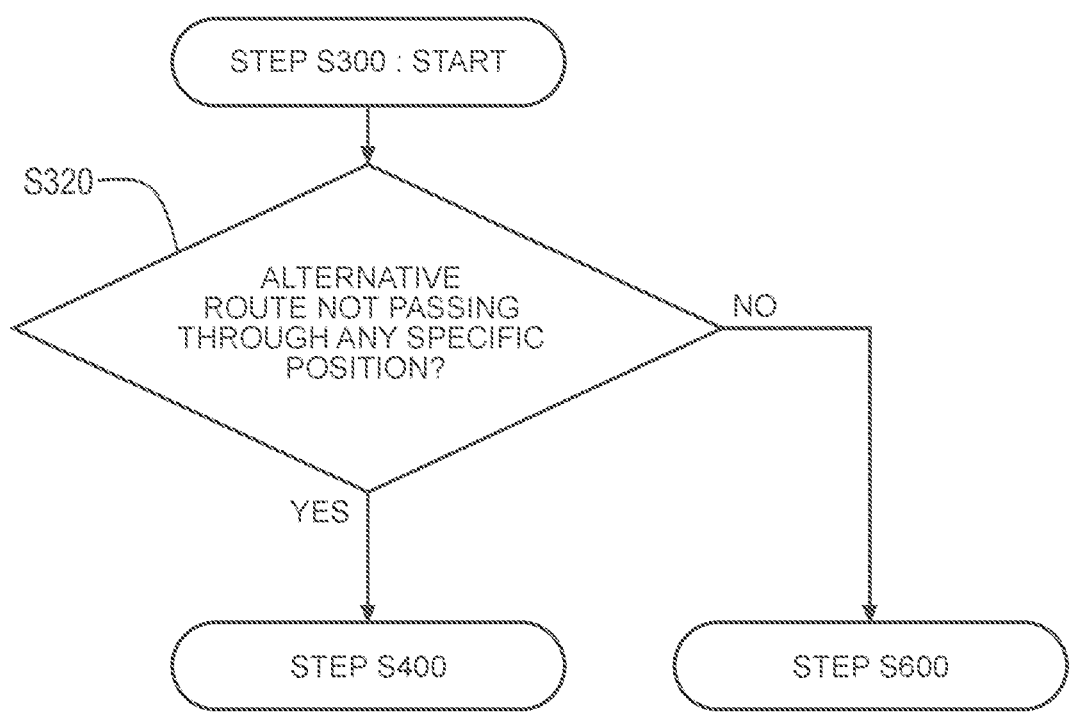
FIG. 13 is a flowchart showing a first example of step S300 according to the embodiment of the present disclosure.

FIG. 13 is a flowchart showing a first example of step S300.

In step S320, the processor 110 searches for the alternative route RT2 along which the autonomous vehicle 1 reaches the destination DST from the current position P1 without passing through any specific position PS. When such the alternative route RT2 is found (step S320; YES), the routine proceeds to step S400. When no such alternative route RT2 is found (step S320; NO), the routine proceeds to step S600.

According to the first example, the processor 110 can search for the alternative route RT2 that is not affected by the abnormality in the remote support system 4.

4-3-2. Second Example

Figure 14:
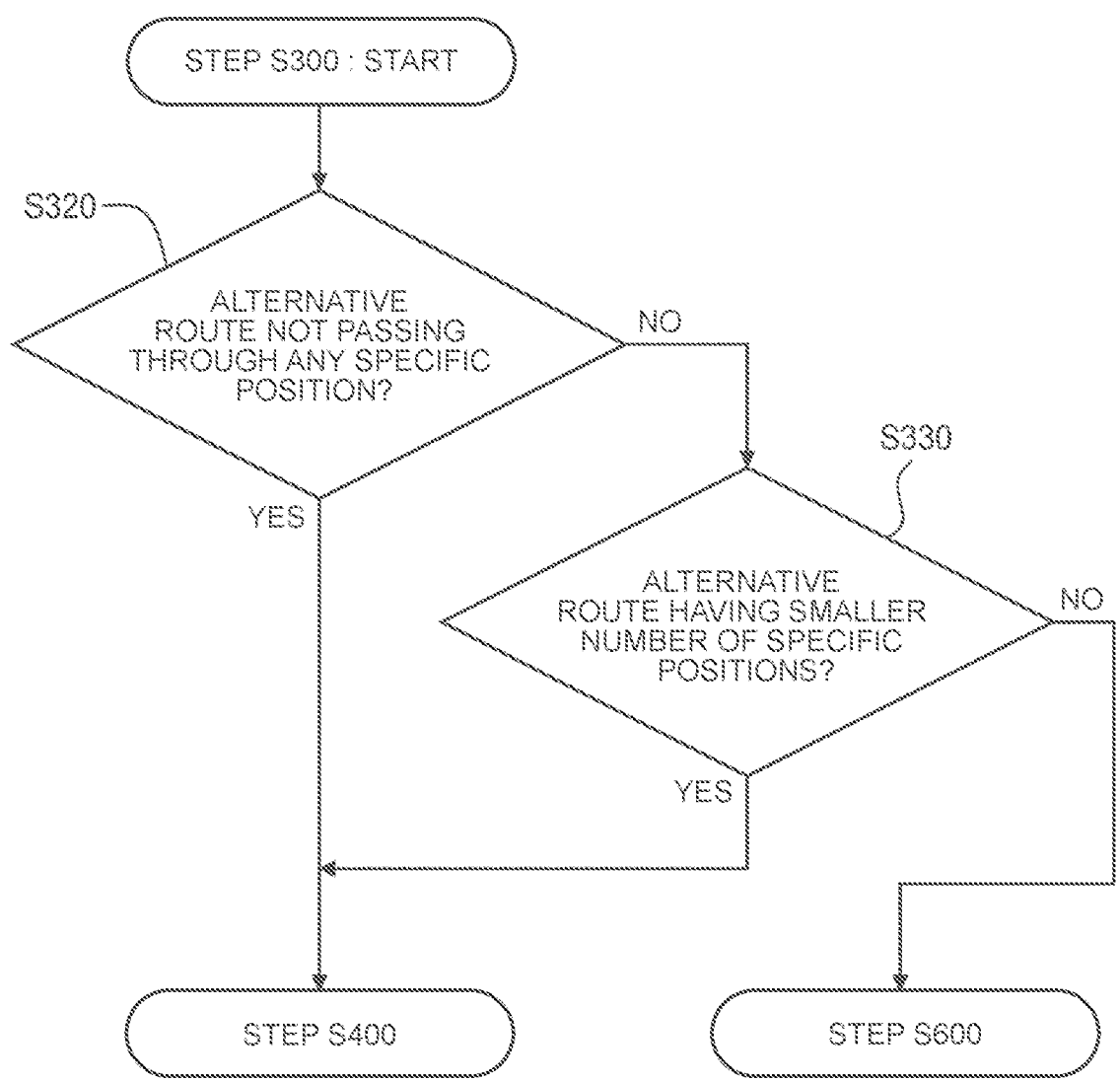
FIG. 14 is a flowchart showing a second example of step S300 according to the embodiment of the present disclosure.

FIG. 14 is a flowchart showing a second example of step S300. Step S320 is similar to that in the first example. When the alternative route RT2 that does not pass through any specific position PS is not found (step S320; NO), the routine proceeds to step S330.

In step S330, the processor 110 searches for the alternative route RT2 having a smaller number of specific positions PSs to be passed through by the autonomous vehicle 1 than the first target route RT1. When such the alternative route RT2 is found (step S330; YES), the routine proceeds to step S400. When no such alternative route RT2 is found (step S330; NO), the routine proceeds to step S600.

According to the second example, selection of the alternative route RT2 can be expanded. That is, the condition imposed on the alternative route RT2 can be relaxed.

4-3-3. Third Example

Figure 15:
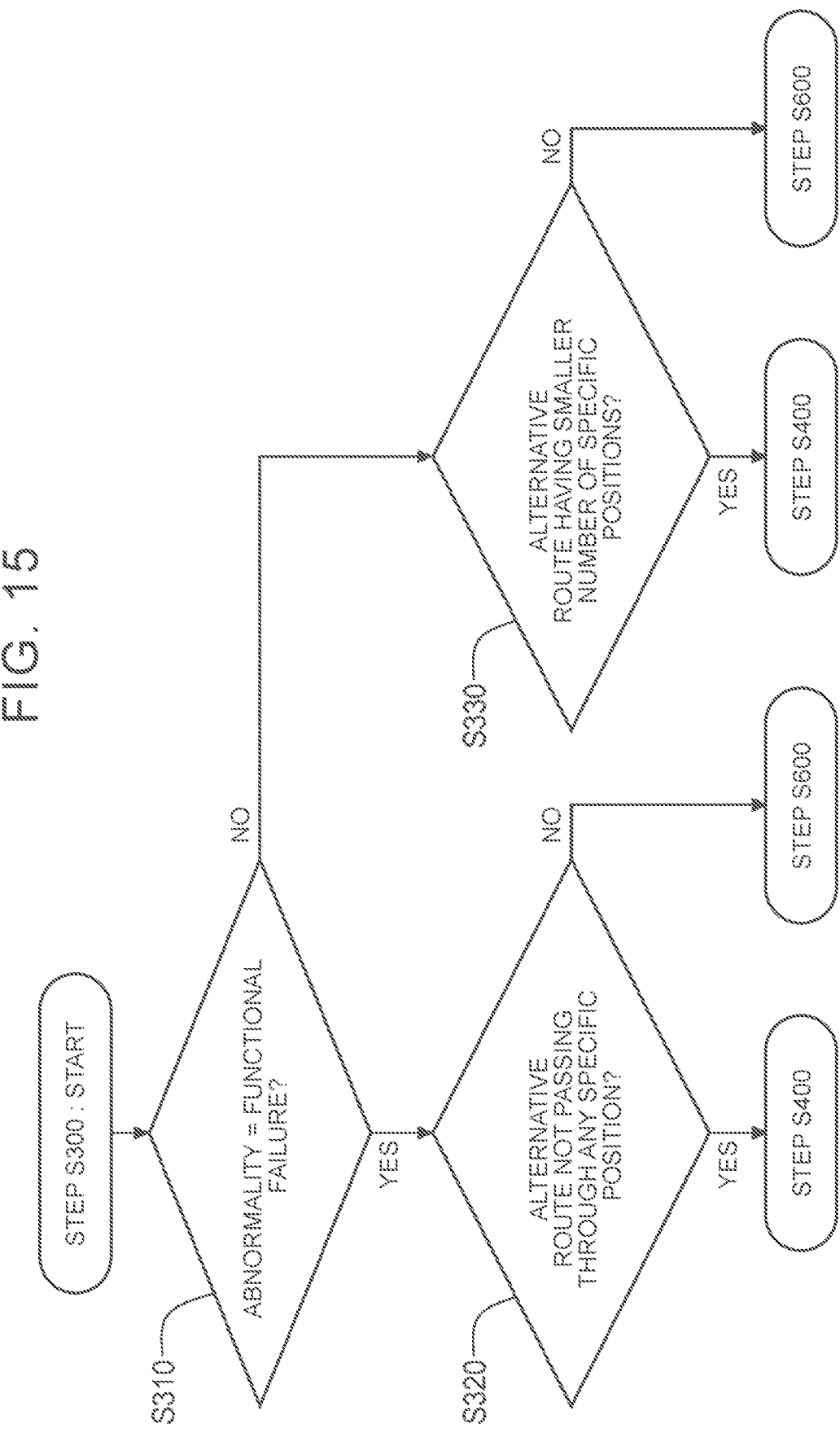
FIG. 15 is a flowchart showing a third example of step S300 according to the embodiment of the present disclosure.

FIG. 15 is a flowchart showing a third example of step S300.

In step S310, the processor 110 determines whether the abnormality in the remote support system 4 is a functional failure or performance degradation.

When the abnormality in the remote support system 4 is a functional failure (step S310; YES), the routine proceeds to step S320. Step S320 and the subsequent steps are similar to those in the first example.

When the abnormality in the remote support system 4 is performance degradation (step S310; NO), the routine proceeds to step S330. Step S330 and the subsequent steps are similar to those in the second example. The alternative route RT2 herein also includes the alternative route RT2 that does not pass through any specific position PS.

According to the third example, selection of the alternative route RT2 can be expanded when the abnormality in the remote support system 4 is performance degradation. That is, the condition imposed on the alternative route RT2 can be relaxed when the abnormality in the remote support system 4 is performance degradation.

4-4. Step S400

In step S400, the processor 110 performs the rerouting process. Specifically, the processor 110 changes the target route RT to the destination DST from the first target route RT1 to the alternative route RT2. The routine then proceeds to step S500.

4-5. Step S500

In step S500, the processor 110 performs the vehicle driving control based on the driving environment information 200 so that the autonomous vehicle 1 moves toward the destination DST along the alternative route RT2.

4-6. Step S600

In step S600, the processor 110 performs the evacuation process in which the autonomous driving system 10 safely evacuates the autonomous vehicle 1.

Specifically, the processor 110 sets a target evacuation position PE on and around the road on the first target route RT1. At this time, the processor 110 sets the target evacuation position PE so that the autonomous vehicle 1 can actually stop, based on the current position P1, vehicle speed, motion performance, etc. of the autonomous vehicle 1. The processor 110 may further refer to the evacuation area information 230. The evacuation area information 230 indicates the positions of a candidate stopping area AC and the no stopping area AX. The processor 110 avoids the no stopping area AX for the desired evacuation position PE, and sets the target evacuation position PE within the candidate stopping area AC. The evacuation area information 230 may indicate the priority level of each candidate stopping area AC. In that case, the processor 110 sets the target evacuation position PE so that the target evacuation position PE is included in the candidate stopping area AC having as high a priority level as possible.

The processor 110 then performs the vehicle driving control so that the autonomous vehicle 1 moves toward the target evacuation position PE and stops at the target evacuation position PE. For example, the processor 110 generates the target trajectory TR that the autonomous vehicle 1 moves from the current position P1 toward the target evacuation position PE and stops at the target evacuation position PE. The autonomous driving system 10 then performs the vehicle driving control so that the autonomous vehicle 1 follows the target trajectory TR (see FIG. 7).

What is claimed is:

1. An autonomous driving system, comprising:
one or more storage devices that store specific position information indicating a specific position where an autonomous vehicle has a possibility to require remote support; and
one or more processors configured to
set a first target route as a target route that is a route to a destination,
determine whether an abnormality has occurred in a remote support system, the remote support system being configured to provide the remote support to the autonomous vehicle that is an object of the remote support,
when the abnormality is performance degradation detected in the remote support system, search for an alternative route that is a route to the destination based on the specific position information, the alternative route having a smaller number of the specific positions to be passed through by the autonomous vehicle than the first target route,
when the alternative route is found, change the target route from the first target route to the alternative route, and
control the autonomous vehicle.

2. The autonomous driving system according to claim 1, wherein the one or more processors are configured to search for the alternative route along which the autonomous vehicle reaches the destination without passing through the specific position, based on the specific position information.

3. The autonomous driving system according to claim 1, wherein the one or more processors are configured to
search for the alternative route along which the autonomous vehicle reaches the destination without passing through the specific position, based on the specific position information, and
when the alternative route along which the autonomous vehicle reaches the destination without passing through the specific position is not found, search for the alternative route having the smaller number of the specific positions to be passed through by the autonomous vehicle based on the specific position information.

4. The autonomous driving system according to claim 1, wherein the one or more processors are configured to, when the one or more processors alternatively determine that the abnormality in the remote support system is a functional failure, search for the alternative route along which the autonomous vehicle reaches the destination without passing through the specific position, based on the specific position information.

5. The autonomous driving system according to claim 1, wherein the one or more processors are configured to, when the alternative route is not found,
set a target evacuation position on the first target route, and
control the autonomous vehicle to stop at the target evacuation position.

6. The autonomous driving system according to claim 1, wherein the one or more processors are configured to control the autonomous vehicle to move toward the destination along the target route.

7. The autonomous driving system according to claim 1, further comprising a communication device configured to communicate with an outside of the autonomous vehicle, wherein, when the one or more processors receive distribution information from an information providing server outside the autonomous vehicle or roadside infrastructure via the communication device, the one or more processors are configured to add the specific position to the specific position information based on the distribution information.

8. The autonomous driving system according to claim 1, wherein:
the one or more storage devices store map information; and
the map information includes the specific position information.

9. The autonomous driving system according to claim 1, wherein the specific position includes an intersection.

10. The autonomous driving system according to claim 1, wherein the specific position includes a position other than an operational design domain.

11. The autonomous driving system according to claim 1, wherein the specific position includes a construction section, a traffic jam section, and an accident location.

12. An autonomous driving control method, comprising:
setting a first target route as a target route that is a route to a destination;
determining whether an abnormality has occurred in a remote support system, the remote support system being configured to provide remote support to an autonomous vehicle that is an object of the remote support;
when the abnormality is performance degradation detected in the remote support system, searching for an alternative route that is a route to the destination based on specific position information indicating a specific position where the autonomous vehicle has a possibility to require the remote support, the alternative route having a smaller number of specific positions to be passed through by the autonomous vehicle than the first target route;
when the alternative route is found, changing the target route from the first target route to the alternative route; and
controlling the autonomous vehicle.

13. A non-transitory storage medium storing an autonomous driving control program that is executable by one or more processors and that causes the one or more processors to perform functions, the functions comprising:
  setting a first target route as a target route that is a route to a destination;
  determining whether an abnormality has occurred in a remote support system, the remote support system being configured to provide remote support to an autonomous vehicle that is an object of the remote support;
  when the abnormality is performance degradation detected in the remote support system, searching for an alternative route that is a route to the destination based on specific position information indicating a specific position where the autonomous vehicle has a possibility to require the remote support, the alternative route having a smaller number of specific positions to be passed through by the autonomous vehicle than the first target route;
  when the alternative route is found, changing the target route from the first target route to the alternative route; and
  controlling the autonomous vehicle.

14. The autonomous driving system according to claim 1, wherein the performance degradation in the remote support system comprises a decrease in communication speed, an increase in communication delay.

15. The autonomous driving control method according to claim 12, wherein the performance degradation in the remote support system comprises a decrease in communication speed, an increase in communication delay.

16. The non-transitory storage medium according to claim 13, wherein the performance degradation in the remote support system comprises a decrease in communication speed, an increase in communication delay.

* * * * *